Patented June 17, 1924.

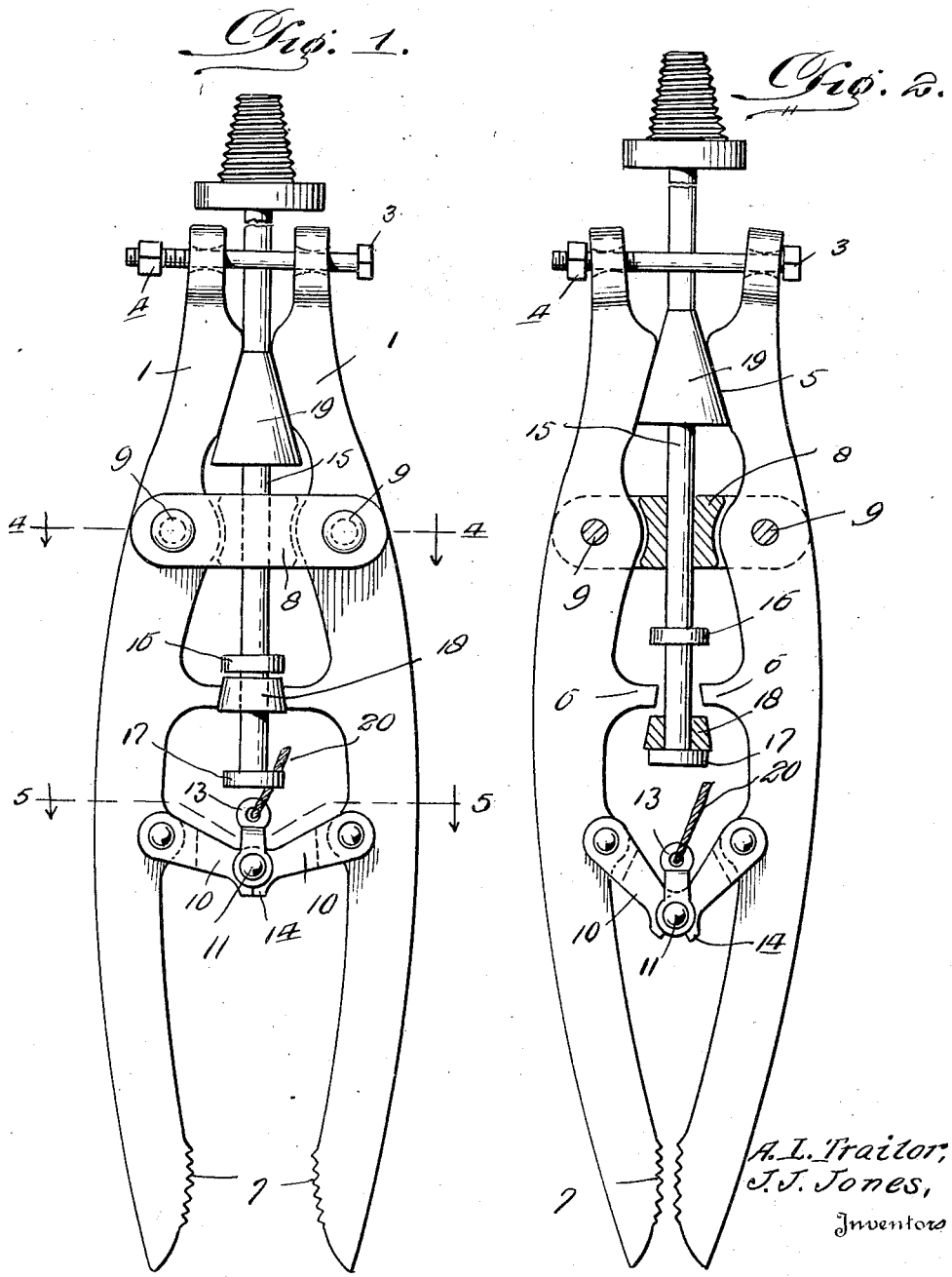

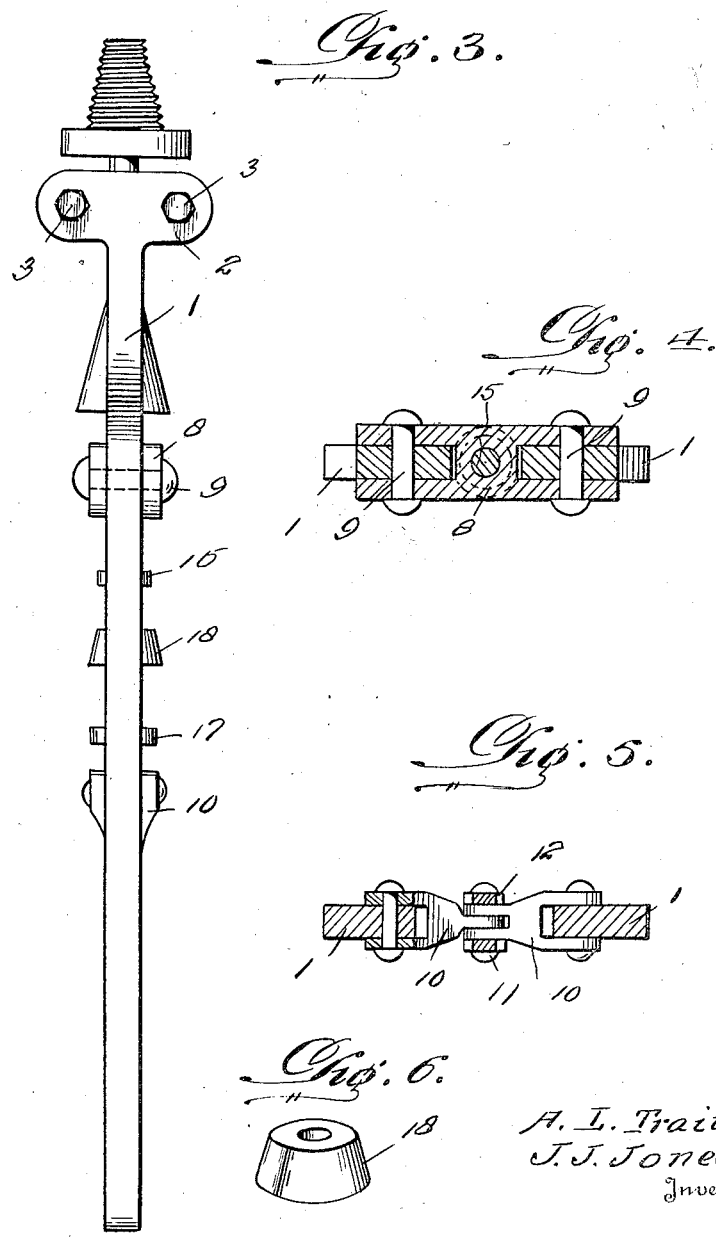

1,498,251

UNITED STATES PATENT OFFICE.

ALBERT L. TRAILOR AND JOHNIE J. JONES, OF WICHITA FALLS, TEXAS; SAID TRAILOR ASSIGNOR OF ONE-HALF OF HIS INTEREST TO SAID JONES.

CABLE FISHING TOOL.

Application filed August 29, 1923. Serial No. 659,943.

*To all whom it may concern:*

Be it known that we, ALBERT L. TRAILOR and JOHNIE J. JONES, citizens of the United States, residing at Wichita Falls, in the county of Wichita and State of Texas, have invented certain new and useful Improvements in Cable Fishing Tools, of which the following is a specification.

The object of this invention is the production of a fishing tool for recovering lugs, parts of machinery, etc., which may have fallen through an oil or other well casing.

In carrying out our invention we propose to produce a fishing tool comprising a pair of pivotally connected jaws normally sustained in open position and susceptible, when brought against an article to be recovered to automatically release the spacing means therebetween and to gravitate on the supporting stem therefor to permit of the swinging of said jaws on their pivots to closed and gripping position.

It is also our purpose to produce a fishing tool in which gripping jaws are employed and which have slidably arranged between the pivotal means therefor a stem on which there is a slidable element engageable with the jaws for holding the same spread, the lower end of the stem being in the path of contact with a latch comprising pivotally connected links which also assist in holding the jaws in open position, and whereby, when the jaws are brought against an article to be recovered the stem will be moved outwardly between the jaws or the jaws upwardly on the stem whereby the stem will contact and break the latching means, release the holding means and permit of the jaws swinging to closed position, the said jaws being so influenced and locked by contacting engagement thereof with an element on said stem.

It is a further object to produce a fishing tool characteristic of simplicity in construction, cheapness in manufacture and thorough efficiency in operation.

With the foregoing, and other objects in view which will present themselves as the nature of the invention is disclosed, reference is to be had to the drawings which accompany and which form part of this application.

In the drawings:—

Figure 1 is a side elevation of our improved fishing tool, the jaws being in open position.

Figure 2 is a similar view with the jaws closed, parts being in section.

Figure 3 is an edge view.

Figure 4 is a sectional view on the line 4—4 of Figure 1.

Figure 5 is a sectional view on the line 5—5 of Figure 1.

Figure 6 is a perspective view of the slidable element which holds the jaws open.

Referring now to the drawings in detail, the jaws of our improvement are broadly indicated by the numeral 1. Two jaws are employed but as each is of a similar construction a description of one will be taken as applicable to the other. Each jaw has at its upper end a lateral extension providing ears 2. The ears, adjacent to their ends have aligning openings which gradually decrease in size from the center to the ends thereof, and through the aligning pairs of openings there are passed headed bolts 3 engaged by nuts 4. The bolts centralize the stem, hereinafter to be described, with respect to the jaws, assist in sustaining the jaws in proper spaced relation, and limit the swinging of the jaws to closed position.

Below the ears 2, each jaw has its inner edge inclined as at 5, and at suitable distance below the said inclined surfaces the jaws are provided with inwardly projecting lugs 6. Each jaw is preferably curved and has its active end toothed as at 7.

Between the jaws there is a spaced block 8, positioned approximately centrally between the inclined sufaces 5 and the lugs 6. The spaced block has its ends bifurcated to receive therein the respective jaws, and pivot members 9 connect the block and jaws.

At a suitable distance below the lugs 6 there is arranged a latch. The latch comprises a pair of links 10 respectively each of which being pivoted to one of the jaws 1. One of the links 10 has its free end reduced to provide a tongue that is received in the bifurcated free end of the other link, a pivot 11 passing through the said ends of the links. This pivot also connects a bail 12 to the latch. The bail has an outer or upper eye portion 13 to which a cable is attached. The confronting ends of the links 10 are preferably formed with ears 14 designed for abutment whereby the links are sustained at an angle with respect to each other when the jaws are in open position, as disclosed in Figure 1.

The spacer block 8 is provided with a central opening through which passes a portion of the suspending stem 15 of the improvement. The stem, below the block 8 is provided with spaced enlargements or flanges 16 and 17 respectively. Slidable on the stem, between the flanges 16 and 17 there is a frusto-conical member 18. The member 18 is susceptible to movement between and to contact with the lugs 6 to hold the jaws 1 in spread position, the latch also sustaining the jaws in such position.

The stem has the portion thereof above the block 8 formed with a conical enlargement 19 arranged between the angle surfaces 5 on the jaws, and the outer end of the stem is provided with the usual shoulder and threaded lug on which the next stem section is secured.

By reference to Figure 1 of the drawings it will be seen that when the spreader element 18 is arranged between the lugs 6 the flange 16 of the stem 15 is disposed in slight contact therewith and that the lower flange 17 is arranged directly above and in the path of contact with the bail 13 of the breakable latch. The tool is lowered in the well casing in the usual manner. When either of the jaws contacts an article to be recovered the jaws will necessarily halt in their downward movement in the well, while the stem will be still lowered. The lowering of the stem causes the flange 16 to move the spreader element from between the lugs 6 and the flange 17 to break the joint of the latch. The jaws by their weight will swing to closed position, but an upward pull on the stem will bring the conical enlargements 19 in wiping engagement with the inclined surfaces 5 on the jaws, thus further swinging the jaws to closed and gripping position so that the article between the jaws will be locked thereto. Should the weight of the gripped obstacle prove such that the fishing tool is rendered liable to breakage, the stem is again lowered to bring the conical enlargement thereof a sufficient distance below the angle surfaces of the jaws to allow the spreading of the latter. The jaws are swung to spread position by a pull on a cable 20 secured to the eye 13 on the bail 12 of the latch, such pull causing the spreading of the links or arms of the latch, and consequent opening of the jaws. Thus the fishing tool may be drawn out of the well hole. The frusto-conical member 19 is preferably removably secured on the stem so that various sizes of these members may be employed.

While we have herein set forth a satisfactory embodiment of our improvement, the nature of the same is such as to render our fishing tool susceptible to changes and modifications, and therefore we hold ourselves entitled to such departures therefrom as fairly fall within the scope of what we claim.

Having described the invention, we claim:—

1. In a fishing tool, a pair of spaced pivotally connected gripping jaws, a stem therebetween, a slidable spacer member on the stem engageable with the jaws to hold the latter in spread condition, a breakable latch below the stem also holding the jaws in spread condition, elements on the stem susceptible to contact with the spacer member and with the latch to move the former out of jaw engagement and to break the latter to permit of the jaws swinging to closed position when contacting an obstacle.

2. In a fishing tool, a pair of spaced pivotally connected jaws, a stem therebetween, a slidable element on the stem engaging the jaws for sustaining the same in spread condition, a fixed element on the stem having a wiping engagement with the jaws for likewise sustaining the latter in spread condition, a breakable latch pivoted to the jaws below the stem, means on the stem for contacting the slidable element to release the same from jaw engagement when the stem is moved downwardly between the jaws, means on the stem for breaking the jointed latch when so moved to permit of the closing of the jaws and said fixed element on the stem designed to move the jaws to further closed position when an upward pull is exerted on said stem.

3. In a fishing tool, a pair of jaws, a spacer block to which the jaws are pivoted, lugs on the jaws below the spacer block, a breakable latch pivotally connected to the jaws designed to assist in holding the same in open position, a stem between the jaws movable through the spacer block, spaced flanges thereon, a slidable element on the stem between said flanges designed to be arranged between the lugs to also hold the jaws in open position, a conical enlargement on the stem above the spacer block in wiping engagement with the jaws, and said stem, when moved downwardly between the jaws, when the latter are halted in movement by contact with an obstacle designed to have its lower flange break the latch and move the slidable element from between the lugs to permit of the swinging of the jaws toward each other, and an upward movement of the stem designed to bring the conical member in wiping engagement with the jaws to further swing the same to closed position.

4. In a fishing tool, a pair of spaced pivotally connected gripping jaws, a stem therebetween, a slidable spacer member on the stem engageable with the jaws to hold the latter in spread condition, a breakable latch below the stem also holding the jaws in spread condition, elements on the stem susceptible to contact with the spacer member and with the latch to move the former out of jaw engagement and to break the latter to permit of the jaws swinging to closed position when contacting an obstacle, means centralizing the stem with respect to the jaws, providing guides for said jaws, and limiting the swinging of the jaws in closed position.

5. In a fishing tool, a pair of spaced pivotally connected gripping jaws, a stem therebetween, a slidable spacer member on the stem engageable with the jaws to hold the latter in spread condition, a breakable latch below the stem also holding the jaws in spread condition, elements on the stem susceptible to contact with the spacer member and with the latch to move the former out of jaw engagement and to break the latter to permit of the jaws swinging to closed position when contacting an obstacle, and flexible means associated with the latch operable to influence the same to spread the jaws when the stem is again lowered, for the purpose set forth.

In testimony whereof we affix our signatures.

ALBERT L. TRAILOR.
JOHNIE J. JONES.